(12) United States Patent
Coldwell (10) Patent No.: US 10,328,783 B2
(45) Date of Patent: Jun. 25, 2019

(54) COMPONENT MOUNT

(71) Applicant: Ford Global Technologies, LLC, Dearborn, MI (US)

(72) Inventor: Mel Coldwell, Maldon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 15/204,191

(22) Filed: Jul. 7, 2016

(65) Prior Publication Data
US 2017/0023172 A1    Jan. 26, 2017

(30) Foreign Application Priority Data
Jul. 22, 2015 (GB) .................................. 1512892.9

(51) Int. Cl.
    *F16M 13/02*    (2006.01)
    *B60K 5/12*    (2006.01)
    *F16F 1/38*    (2006.01)

(52) U.S. Cl.
    CPC .......... *B60K 5/1208* (2013.01); *B60K 5/1283* (2013.01); *F16F 1/3849* (2013.01)

(58) Field of Classification Search
CPC ..... F16M 13/02; F16F 1/3849; B60K 5/1283; B60K 5/1208
USPC .................. 267/175, 176, 177; 248/638, 550
See application file for complete search history.

(56) References Cited

U.S. PATENT DOCUMENTS

| | | | |
|---|---|---|---|
| 5,219,037 A | 6/1993 | Smith et al. | |
| 5,564,537 A * | 10/1996 | Shoureshi | |
| 5,636,826 A * | 6/1997 | Nakagaki | F16F 7/00 248/224.51 |
| 6,321,890 B1 * | 11/2001 | Suzuki | B60K 5/1208 188/379 |
| 7,194,344 B2 | 3/2007 | Gee et al. | |
| 7,891,673 B2 | 2/2011 | Delorenzis et al. | |

(Continued)

FOREIGN PATENT DOCUMENTS

| | | |
|---|---|---|
| EP | 2940345 A1 | 4/2015 |
| JP | 2009185883 A | 8/2009 |
| JP | 2011190884 A | 9/2011 |

OTHER PUBLICATIONS

Examination Report of Great Britain Patent Application No. 1512892.9, dated Jan. 27, 2016, 4 pages, United Kingdom Intellectual Property Office.

(Continued)

*Primary Examiner* — Muhammad Ijaz
(74) *Attorney, Agent, or Firm* — Julia Voutyras; McCoy Russell LLP (57) ABSTRACT

A component mount is disclosed having two parallel compressible load paths interposed between first and second attachment members and a coupling mechanism. When a force above a predefined level is predicted to be transferred, the coupling mechanism is engaged so that both of the compressible load paths act in parallel to transfer the force between the first and second attachment members, and when the predicted level of the force to be transferred is below the predefined level, the coupling mechanism is disengaged and the force is transmitted through only the first compressible load path. Therefore the stiffness of the component mount is changed based upon whether a high or a low force has to be transmitted.

20 Claims, 3 Drawing Sheets

(56) References Cited

U.S. PATENT DOCUMENTS

| | | | |
|---|---|---|---|
| 8,430,382 B2* | 4/2013 | Kashihara | B60K 5/1241 |
| | | | 267/140.12 |
| 8,915,340 B2* | 12/2014 | Vervoordeldonk | |
| 8,918,253 B2 | 12/2014 | Norton et al. | |
| 9,004,468 B2* | 4/2015 | Kamei | B60K 5/1241 |
| | | | 267/141.1 |
| 2003/0214085 A1* | 11/2003 | Makino | F16F 1/3849 |
| | | | 267/140.12 |
| 2004/0262830 A1* | 12/2004 | Maeno | F16F 13/101 |
| | | | 267/140.4 |
| 2004/0262831 A1* | 12/2004 | Maeno | B60K 5/1208 |
| | | | 267/140.13 |
| 2005/0206057 A1* | 9/2005 | Endo | F16F 1/3849 |
| | | | 267/292 |
| 2005/0212188 A1* | 9/2005 | Endo | F16F 1/3849 |
| | | | 267/141.2 |
| 2007/0018367 A1* | 1/2007 | Kamei | F16F 1/3863 |
| | | | 267/140.12 |
| 2007/0272051 A1* | 11/2007 | Kamei | B60G 7/001 |
| | | | 74/579 R |
| 2009/0174126 A1* | 7/2009 | Takeshima | B60K 5/1208 |
| | | | 267/140.4 |
| 2010/0244341 A1 | 9/2010 | Nemoto | |
| 2012/0112395 A1* | 5/2012 | Mizobe | F16F 1/3828 |
| | | | 267/139 |
| 2013/0168907 A1* | 7/2013 | Mizobe | F16F 1/3849 |
| | | | 267/141 |
| 2015/0231942 A1* | 8/2015 | Trangbaek | F16F 1/3849 |
| | | | 267/195 |
| 2015/0247559 A1* | 9/2015 | Graves | F02B 67/06 |
| | | | 474/117 |
| 2016/0097436 A1* | 4/2016 | Goold | |
| 2016/0272026 A1* | 9/2016 | Mark | B60K 5/1241 |
| 2017/0023172 A1* | 1/2017 | Coldwell | B60K 5/1283 |
| 2017/0167565 A1* | 6/2017 | Yun | F16F 13/305 |

OTHER PUBLICATIONS

"Lincoln Introduces Intelligent CCD Suspension," http://http://blog.planetlincoln.com/2014/03/26/lincoln-introduces-intelligent-ccd-suspension/, Mar. 24, 2014, Accessed Sep. 1, 2016.

* cited by examiner

COMPONENT MOUNT

CROSS REFERENCE TO RELATED APPLICATION

This application claims priority to Great Britain Patent Application No. 1512892.9, filed Jul. 22, 2015, the entire contents of which are hereby incorporated by reference for all purposes.

FIELD

This invention relates to resilient, compressible mounts for components subject to displacement and vibration when a load is applied thereto and in particular to a component mount having more than one level of resistance to displacement.

BACKGROUND/SUMMARY

It is known that a simple bracket is sufficient to only achieve position control of a component that is to say to prevent displacement of the component relative to another object. To provide vibration isolation of the component a compressible element such as one or more elastomeric or rubber members are normally included as part of a component mount but the inclusion of such a compressible element in a component mount will result in displacement of the component when a load is applied.

In many uses a relatively soft or low stiffness compressible element is desirable to reduce the transmission of vibrations to or from the component but such a soft compressible element will result in unacceptably large displacements of the component when a high load is applied to the component mount.

It is an object of this invention to provide a component mount that provides good vibration isolation when a low load is applied to the component mount and a reduced component displacement when a high load is applied to the component mount.

According to a first aspect of the invention there is provided a component mount comprising a number of attachment members for use in attaching the component mount to a component to be supported and a support structure, a number of compressible load paths between the attachment members and a coupling mechanism wherein the coupling mechanism has a disengaged state in which all the force transmitted through the component mount is transmitted by a first one of the load paths and one or more engaged states in which the first load path and a least one further compressible load path are connected together in parallel by the coupling mechanism and the force transmitted through the component mount is transmitted by the compressible load paths that are acting in parallel.

The component mount may comprise a first attachment member for use in attaching the component mount to a component to be supported, a second attachment member to attach the component mount to a support structure, primary and secondary compressible load paths between the first and second attachment members and a coupling mechanism wherein the coupling mechanism has a disengaged state in which all the force transmitted through the component mount between the first and second attachment members is transmitted by only the primary load path and an engaged state in which the primary and secondary compressible load paths are connected together in parallel by the coupling mechanism between the first and second attachment members and the force transmitted through the component mount between the first and second attachment members is transmitted by both of the compressible load paths acting in parallel.

The primary compressible load path may have a first stiffness, the secondary compressible load path may have a second stiffness and when the coupling mechanism is in the engaged state the resulting stiffness of the connection between the first and second attachment members may be equal the sum of the first stiffness and the second stiffness.

When the coupling mechanism is in the disengaged state the resulting stiffness of the connection between the first and second attachment members may be equal the first stiffness.

One of the first and second attachment members may be a link arm and the other of the first and second attachment members may be a mounting plate.

The mounting plate may form the first attachment member and the link arm may form the second attachment member.

The primary compressible load path may comprise a first compressible member attached at one end to the mounting plate and attached at an opposite end to the link arm and the secondary compressible load path may comprises a second compressible member attached at one end to the mounting plate and attached at an opposite end to a load transfer member.

The second compressible member may comprise two compressible elements connected in parallel between the mounting plate and the load transfer member.

The coupling mechanism may comprise a slideable coupling member supported by the link arm engageable with an aperture in the load transfer member.

When the coupling member is engaged with the aperture the coupling mechanism may be in the engaged state and when the coupling member is not engaged with the aperture the coupling mechanism may be in the disengaged state.

The primary compressible load path comprises a first compressible member and a third compressible member arranged in series between the first and second attachment members.

One of the first and second attachment members is formed by a first bushing connected to the first compressible member and the other of the first and second attachment members is a second bushing connected to the third compressible member and the first and third compressible members may be connected together by a first link arm having an aperture in each end in which are located the first and second compressible members.

The first bushing may form the first attachment member and the second bushing may form the second attachment member.

The secondary compressible load path may comprise a second compressible member located in an aperture in a second link arm.

The second link arm may be slideably supported by the first link arm.

The coupling mechanism may comprise a slideable coupling member supported by the first link arm engageable with an aperture in the second link arm.

According to a second aspect of the invention there is provided a component mounting system comprising an actuator controlled by an electronic controller and a component mount constructed in accordance with said first aspect of the invention wherein the actuator is operatively connected to the coupling mechanism and the electronic controller is arranged to use the actuator to control the position of the coupling mechanism based upon the level of force predicted to be transferred by the component mount.

The actuator may be operatively connected to the coupling mechanism, the electronic controller may be arranged to use the actuator to position the coupling mechanism in an engaged state when a level of force above a predefined level is predicted to be transferred by the component mount and position the coupling mechanism in a disengaged state when the force predicted to be transferred is below the predefined level.

The predefined level of force is a force that will produce an unacceptable displacement of the component supported by the component mount if the coupling member is in the disengaged state.

The component mount may be a driveline mount of a motor vehicle and a force above the predefined level may be predicted to occur when an engagement state of a transmission forming part of the driveline is changed from a neutral state to an engaged state.

Alternatively, the component mount may be a driveline mount of a motor vehicle and a force above the predefined level may be predicted to occur when gear ratio of a transmission forming part of the driveline is changed from a first ratio to a second ratio.

BRIEF DESCRIPTION OF THE DRAWINGS

The invention will now be described by way of example with reference to the accompanying drawing of which.

DETAILED DESCRIPTION

Figure 1:
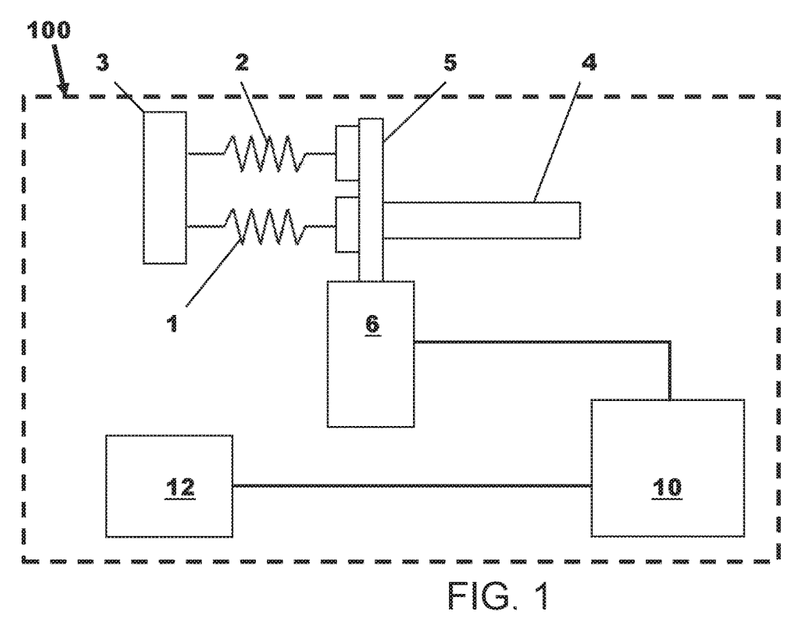
FIG. 1 is a schematic diagram of a component mounting system according to a second aspect of the invention having a component mount according to a first aspect of the invention in a high displacement resistant state.
Figure 2:
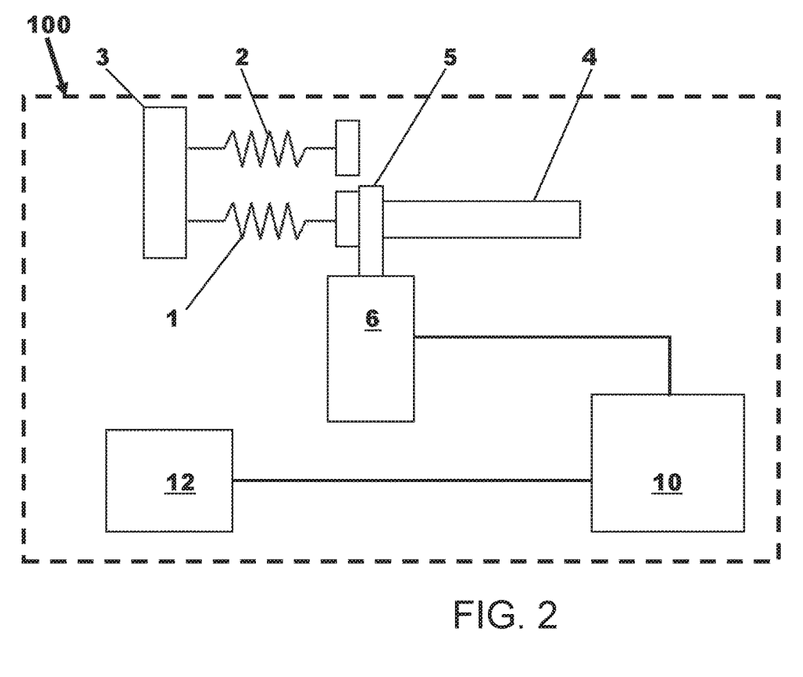
FIG. 2 is a schematic diagram similar to FIG. 1 but showing the component mount in a low displacement resistant state.

Referring firstly to FIGS. 1 and 2 there is shown a component mounting system 100 comprising a component mount, an actuator 6, an electronic controller 10 and an input 12 indicative of potential loading on the component mount.

The component mount comprises of primary and secondary compressible load paths which are in the form of a first spring 1 have a spring rate k1 and a second spring 2 having a spring rate k2 respectively.

The two springs 1, 2 are arranged to transfer load between a first attachment member 3 fastened to an engine or transmission of a motor vehicle and a second attachment member 4 fastened to a chassis part of a motor vehicle.

A slideable coupling member 5 is shown in FIG. 1 in an engaged position linking the two springs 1, 2 so that the two springs 1, 2 are arranged in parallel between the first attachment member 3 and the second attachment member 4.

When the two springs 1, 2 are so connected the stiffness of the connection between the first attachment member 3 and the second attachment member 4 is equal to the sum of the stiffness of the first and second springs 1 and 2.

That is to say: Total stiffness (K)=k1+k2.

The coupling member 5 is shown in FIG. 2 in a disengaged position in which the two springs 1, 2 are not linked together. When the two springs 1, 2 are not connected the stiffness of the connection between the first attachment member 3 and the second attachment member 4 is equal to the stiffness of the first spring 1 as that is the only spring that remains connected between the first attachment member 3 and the second attachment member 4.

The state of coupling between the two springs 1, 2 is therefore determined by the position of the coupling member 5 and this is controlled by the actuator 6 in response to a control signal from the electronic controller 10.

The electronic controller 10 is operable to maintain the coupling member 5 in a disengaged position whenever the transmitted force from the first attachment member 3 to the second attachment member 4 is low or is expected to be low in order to maximize the vibration absorbing property of the component mount.

The transmitted force is low or below a predefined level when the resulting displacement of the component supported by the component mount is not sufficiently large to be a problem and the transmitted force is high when the force is above a predefined force expected to cause unacceptably large displacement of the component supported by the component mount.

However, when the electronic controller 10 receives an indication from one or more input devices 12 that the transmitted force from the first attachment member 3 to the second attachment member 4 is expected to increase from a low level to a high level, the electronic controller 10 is arranged to cause the actuator 6 to move the coupling member 5 into the engaged position in order to maximize the resistance to displacement of the component mount.

The electronic controller 10 is also arranged to cause the actuator 6 to maintain the coupling member 5 in the engaged position whenever a high force is being transmitted by the component mount.

One of the features of the invention is that the electronic controller 10 is arranged to switch the component coupling from a low resistance state to a high resistance state before the force on the component mounting has actually increased to a high level thereby minimizing displacement of a component supported by the component mount.

In the case of a conventional automatic transmission where a fluid coupling is used the engagement of the gears causes load to be transferred to the drive shafts. In the case of a conventional mount this increased load causes a displacement in the powertrain that is resisted by the mount. However, by using information supplied from the inputs 12 about the proposed gear selection, the electronic controller 10 can change the stiffness of a component mount constructed in accordance with this invention prior to the displacement occurring thereby reducing the resulting displacement when the gear selection takes place. The coupling member 5 will in such a case be moved into the engaged position by the actuator 6 when a gear selection is anticipated to occur so that the total stiffness of the component mount will be equal to k1+k2 when the gear selection takes place.

If a manual transmission with a clutch is used then the same actions can be taken in response to clutch actuation. In such a case a clutch pedal position sensor or clutch engagement sensor will form one of the inputs 12 to the electronic controller 10. With a manual clutch system the transfer of force to a mount is only applied when the clutch is sufficiently engaged to transfer torque known as a 'bite point'. Therefore by using a sensor calibrated and able to identify this 'bite point' the electronic controller 10 can use this information to control switching of the component mount to or from a stiffer state. It will be appreciated that the magnitude of the force applied to the engine mount will depend upon various factors including the selected gear ration and the torque output of the engine.

Similarly, the component mount could be switched from a soft state to a stiff state when it is anticipated that a gear change is to take place because it is known that a gear change event often results in a spike in the force transferred to the engine and transmission mounts.

Figure 3:
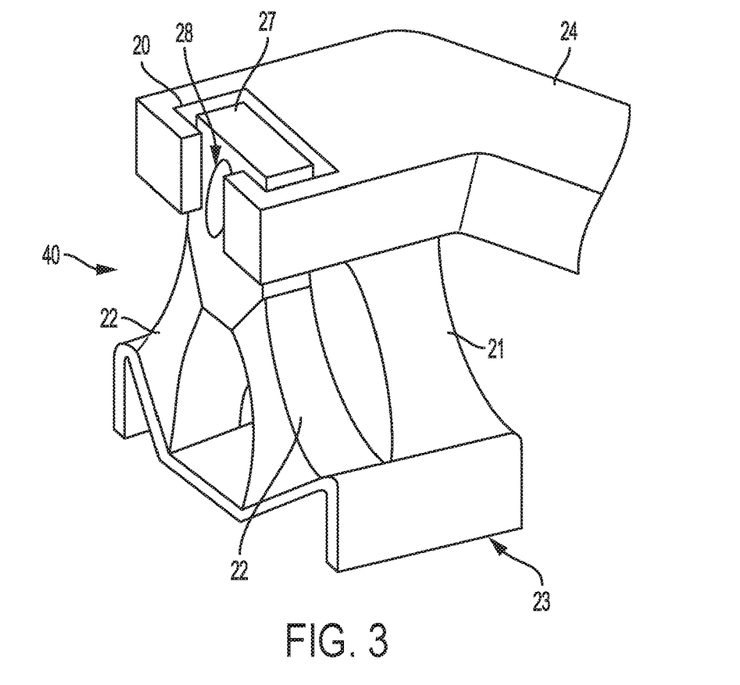
FIG. 3 is a pictorial representation of part of a first embodiment of an engine mount constructed in accordance with the second aspect of the invention.
Figure 4:
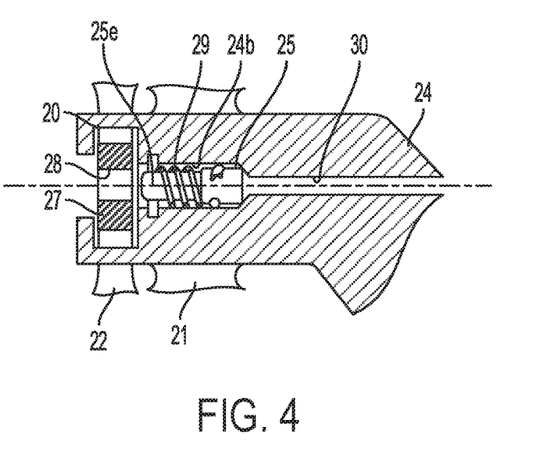
FIG. 4 is a cross-section through part of the engine mount shown in FIG. 3 showing a coupling mechanism.

With reference to FIGS. 3 and 4 there is shown a first embodiment of a resilient, compressible component mount in accordance with the invention in the form of an engine mount 40.

The engine mount 40 comprises of a primary compressible load path in the form of a first compressible member 21, a secondary compressible load path in the form of a second compressible member 22, an engine mounting plate 23 and a link arm 24.

The first compressible member 21 comprises in this case of an elastomeric or synthetic rubber mount that is permanently bonded to the plate 23 and the link arm 24.

The second compressible member 22 comprises two elastomeric or synthetic rubber elements, both of which are bonded at respective first ends to the mounting plate 23 and are bonded at respective second ends to a load transfer member 27. The two compressible elements are connected in parallel between the mounting plate 23 the load transfer member 27.

The load transfer member 27 is located in a clearance aperture 20 formed at one end of the link arm 24. The clearance aperture 27 allows relative movement between the load transfer member 27 and the link arm 24 to occur but prevents excessive relative movement. The combination of the load transfer member 27 and the clearance aperture 20 form in combination a failsafe device ensuring that if a coupling mechanism used to selectively couple the first and second compressible members 21 and 22 fails then the engine mount 40 is always able to engage both of the compressible members 21, 22 to limit the displacement of the engine under high load conditions.

The load transfer member 27 has an elongate aperture 28 formed therein for selective co-operation with a coupling member in the form of a cylindrical end portion 25e of a piston 25. In the case of the example shown, the elongate aperture 28 allows the second compressible member 22 to be loaded in only one plane, however, it will be appreciated that if a round hole were to be used it could be loaded in more than one plane and if the elongate aperture 28 is rotated through 90 degrees then the plane on which the second compressible member 22 can be loaded would be similarly re-orientated. It will be appreciated that a further function of the clearance aperture 20 is to provide alignment and support of the engagement process for the coupling member 25e with the elongate aperture 28. That is to say, it keeps the hole aligned with the coupling member 25e and prevents the coupling member 25e pushing the first and second compressible members 21 and 22 apart if the coupling member 25e is only partially aligned with the elongate aperture 28 when trying to engage the coupling member 25e.

The piston 25 is slidingly mounted in a bore 24b formed in the link arm 24 and is biased away from the load transfer member 27 by a helical spring 29.

A passage 30 formed in the link arm 24 is provided to selectively connect the bore 24b with a source of pressurized fluid. The piston 25 forms in combination with the elongate aperture 28 a coupling mechanism for selectively connecting together the first and second compressible members 21 and 22.

It will be appreciated that the supply of fluid to the chamber 24b is controlled by an electrically actuated valve (not shown). The operation of the valve is electronically controlled by an electronic controller such as the electronic controller 10.

Whenever possible the piston 25 is in the position shown in FIG. 4 in which the cylindrical end portion 25e of the piston 25 is not engaged with the elongate aperture 28 in the load transfer member 27.

The coupling mechanism is therefore disengaged and any force transferred from the plate 23 to the link arm 24 or vice-versa is resisted by only the first compressible member 21.

It will be appreciated that the stiffness of the first compressible member 21 is such that a small applied force will not cause unacceptable displacement of the engine fastened to the mounting plate 23.

When a high load is expected, that is to say, a load that will cause a larger than acceptable displacement of the engine, the electronic controller 10 is arranged to open the valve so as let fluid at pressure flow to the bore 24b. The supply of this pressurized fluid causes the piston 25 to move towards the load transfer member 27 against the action of the spring 29 engaging the cylindrical end portion 25e of the piston 25 with the elongate aperture 28 in the load transfer member 27. When the piston 25 is in this engaged position the coupling mechanism is engaged and any force transferred from the plate 23 to the link arm 24 or vice-versa is resisted by both of the compressible members 21, 22.

Therefore the engine mount 40 is operable in soft and stiff modes to suit the applied force and is able to provide good vibration isolation when a low force is being transferred and prevent a large displacement of the engine when a high force has to be transferred.

It will be appreciated that the engine mount 40 could be fitted in a surrounding frame supporting additional compressible end stops against which the link arm 24 can abut to prevent over displacement of the engine.

Figure 5:
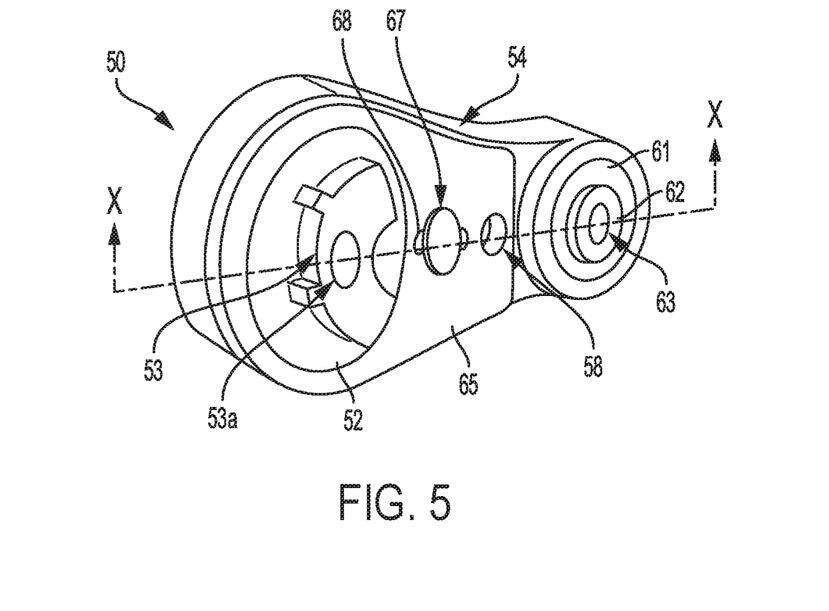
FIG. 5 is a pictorial representation of a second embodiment of an engine mount constructed in accordance with the second aspect of the invention.
Figure 6:
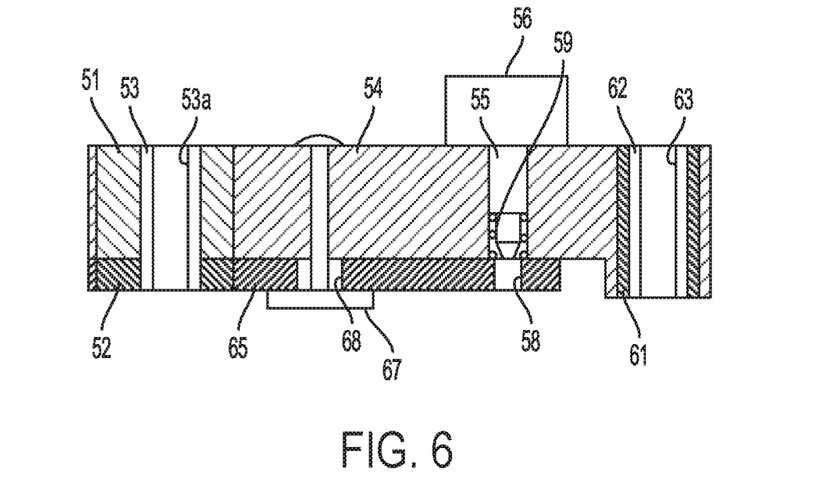
FIG. 6 is a cross-section along the line X-X on FIG. 5.

With reference to FIGS. 5 and 6 there is shown a second embodiment of resilient, compressible component mount in the form of a dog bone engine mount 50.

The engine mount 50 comprises of first and second link arms 54, 65 that are selectively connectable by means of a coupling mechanism.

The first link arm 54 has apertures at both ends in which are bonded respective first and third compressible members 51 and 61 forming a primary compressible load path.

The first compressible member 51 has a first attachment member in the form of a first bushing 53 bonded therein defining a mounting bore 53a used for attaching the engine mount 50 to an engine by the engagement of a threaded fastener (not shown) therewith.

The third compressible member 61 has a second attachment member in the form of a second bushing 62 bonded therein defining a mounting bore 63 used for attaching the engine mount 50 to a chassis part of a motor vehicle by the engagement of a threaded fastener (not shown) therewith.

An electric actuator 56 is mounted on the first link arm 54 for moving a slideable coupling member 55 between engaged and disengaged positions against the action of a spring 59 as will be described in more detail hereinafter.

It will be appreciated that the actuator 56 is controlled by an electronic controller such as the electronic controller 10 to move the coupling member 55 between the engaged and disengaged positions depending upon whether a large force or a low force has to be transmitted by the engine mount 50.

The second link arm 65 has an aperture at a first end in which is bonded a second compressible member 52 forming a secondary compressible load path. The second compressible member 52 is also bonded to the first bushing 53 used for attaching the engine mount 50 to the engine.

The second link arm 65 has near a mid-point thereof an elongate aperture 68 formed therein in which is engaged a support fastener 67. The support fastener 67 slidingly attaches the second link arm 65 to the first link arm 54.

The combination of the elongate aperture 68 and the support fastener 67 form in combination a failsafe device ensuring that if the coupling mechanism used to selectively couple the first and second compressible members 51 and 52 fails the engine mount 50 is always able to engage the first and second compressible members 51 and 52 to limit the displacement of the engine under high load conditions.

The second link arm 65 also has an aperture 58 in a second end opposite to the first end for co-operation with the coupling member 55 so as to selectively connect the first and second links 54 and 65 together. The coupling member 55 has a chamfered lead in so as to assist the coupling member 55 to engage with the aperture 58 when there is a small relative displacement between the first and second link arms 54, 65. The elongate aperture 68 and the support fastener 67 provide alignment and support the engagement of the coupling member 55 with the aperture 58 by keeping the aperture 58 aligned in one direction. Furthermore, elongate aperture 68 and the support fastener 67 prevent the coupling member 55 from pushing the second link 65 away from the first link 54 if the coupling member 55 is not correctly aligned with the aperture 58 when it is to be engaged.

The coupling member 55 and the aperture 58 form in combination the coupling mechanism.

The resistance to displacement between the bushing 62 and the bushing 53 is related to the stiffness (k1) of the first compressible member 51, the stiffness (k2) of the second compressible member 52 and the stiffness (k3) of the third compressible 61.

The first and third compressible members 51 and 61 forming the primary compressible load path are arranged in series and so their equivalent stiffness K will be given by the equation:

$$1/K = (1/k1 + 1/k3)$$

Therefore:

$$K = 1/(1/k1 + 1/k3) \quad (1)$$

The equivalent spring stiffness K will be lower than the softer of the two compressible members 51, 61.

Therefore when the coupling member 55 is not in driving engagement with the aperture 58 the stiffness K of the engine mount will be as given in equation (1) above.

However, when the coupling member 55 is in driving engagement with the aperture 58 the first and second links 54 and 65 are joined together by the engagement of the coupling member 55 with the aperture 58.

The equivalent stiffness K of the engine mount 50 is then equal to the sum of the combined stiffness of the first and third members 51 and 61 as given in equation (1) with the stiffness k2 of the second member 52.

Therefore:

$$K = \frac{k1 \times k3 + k2 \times k3}{k1 + k2 + k3}$$

The engine mount 50 therefore has two stiffness values depending upon whether the coupling member 55 is or is not in driving engagement with the aperture 58 in the second link arm 65.

The coupling member 55 is normally only engaged with the aperture 58 when it is expected that the engine mount 50 will have to transmit a force greater than a predefined level. The level is set such that below the predefined level the displacement of the engine is not significant. For example the magnitude of the force is not sufficient to cause the aperture 58 to be misaligned with the coupling member 55 sufficiently to prevent engagement of the coupling member 55 with the aperture 58.

When an engine is idling it is advantageous to use a soft engine mount in order to maximize vibration isolation and when the engine is providing driving torque it is advantageous to use a stiffer mount because the use of such a soft mount will lead to a large displacement of the engine when even a relatively small load is applied such as selecting drive.

By using a component mount constructed in accordance with this invention can be used to reduce the displacement of the engine at higher loads without compromising vibration isolation.

By reducing engine displacement has the advantages that an engine of increased size can be used without risking interference with other surrounding components and/or smaller clearances between the engine and other components can be used and/or better airflow around the engine can be achieved.

Although the invention has been described with particular reference to two embodiments of an engine mount it will be appreciated that it is not restricted to use as an engine mount and can be used with benefit whenever it is desirable to have different levels of mount stiffness in order to minimize vibration transmission when a low level of force has to be transferred and prevent excessive displacement when a high level of force has to be transferred. For example the component mount could be a mount for a component of driveline of a motor vehicle subject to fluctuating loads such as, for example and without limitation, a transmission, a gearbox or a rear axle differential.

It will be further appreciated that there could be more than two compressible load paths. For example and without limitation, there could be first, second and third load paths and the coupling member is positioned to couple all three compressible load paths in parallel when the force to be transferred is above a first predefined level, couple the first load path with one of the other two load paths in parallel when the force to be transferred is below the first predefined level but above a second lower predefined level and be positioned so as to couple none of the load paths together when the force to be transferred is below the second predefined level so that all of the force is transferred via the first compressible load path. As before, an electronic controller could be used to control the operation of an actuator used to position the coupling member.

Although the coupling mechanism in the disclosed embodiments is a slideable rod or pin it will be appreciated that other disengageable couplings could be used such as, for example, a clutch.

It will also be appreciated that engagement of the coupling mechanism could be a pure mechanical system having no electronic controller and could be operated via levers or cables and the like, or it could be a hydraulic system having no electronic controller.

The Figures show example configurations with relative positioning of the various components. If shown directly contacting each other, or directly coupled, then such elements may be referred to as directly contacting or directly coupled, respectively, at least in one example. Elements described as directly downstream or directly upstream of one another may be defined herein such that there are no intervening components between the two comparative elements. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated by those skilled in the art that although the invention has been described by way of example with reference to several embodiments it is not limited to the disclosed embodiments and that alternative embodiments could be constructed without departing from the scope of the invention as defined by the appended claims.

The invention claimed is:

1. A component mount, comprising:
a first link arm and a second link arm arranged adjacent to one another, the first link arm including apertures at both ends and the second link arm including an aperture at a first end;
a first compressible member bonded in a first aperture of the apertures of the first link arm, a second compressible member bonded in the aperture of the second link arm, and a third compressible member bonded in a second aperture of the apertures of the first link arm;
a first bushing bonded in the first compressible member for use in attaching the component mount to a component to be supported and a second bushing bonded in the third compressible member to attach the component mount to a support structure;
a first compressible load path formed by the first compressible member, the first link arm, and the third compressible member and a second compressible load path formed by the second compressible member and the second link arm; and
a coupling member, wherein the coupling member is movable between a disengaged state in which the first load path is not connected to the second load path by the coupling member and all of a force transmitted through the component mount, between the first bushing and the second bushing, is transmitted by the first load path and one or more engaged states in which the first load path and the second load path are connected together in parallel by the coupling member, and the force transmitted through the component mount, between the first bushing and the second bushing, is transmitted by the first load path and the second load path that are acting in parallel.

2. The component mount as claimed in claim 1, wherein the component mount is shaped as a dog bone, where both of said ends of the first link arm and the first end of the second link arm are rounded, and wherein the first load path and the second load path are arranged parallel to one another.

3. The component mount as claimed in claim 2, wherein the first load path has a first stiffness, the second load path has a second stiffness, and, when the coupling member is in the engaged state, the first link arm is directly coupled to the second link arm via the coupling member and a resulting stiffness of a connection between the first and second bushings is equal to a sum of the first stiffness and the second stiffness.

4. The component mount as claimed in claim 3, wherein, when the coupling member is in the disengaged state, the first link arm is not directly coupled to the second link arm via the coupling member and the resulting stiffness of the connection between the first and second bushings is equal to the first stiffness.

5. The component mount as claimed in claim 2, wherein the first compressible member, the third compressible member, and first link arm are arranged in series with one another, where the second compressible member and the second link arm are arranged in series with one another, and wherein the first link arm is arranged on a first side of the component mount and the second link arm is arranged on an opposite, second side of the component mount.

6. The component mount as claimed in claim 5, wherein the second compressible member is bonded to the first bushing and wherein the first bushing runs through the first aperture of the first link arm and the aperture of the second link arm, from the first side to the second side of the component mount.

7. The component mount as claimed in claim 6, wherein the second bushing runs through the second aperture of the first link arm, from the first side to the second side of the component mount, and wherein a second end of the second link arm is spaced away from the second bushing and the third compressible member, at the second side of the component mount.

8. The component mount as claimed in claim 5, wherein the second link arm is slideably supported by the first link arm via a support fastener running through an elongate aperture formed within the second link arm, proximate to a mid-point of the second link arm, the elongate aperture wider than a width of the support fastener.

9. The component mount as claimed in claim 1, wherein the coupling member comprises a slideable coupling member supported by the first link arm and engageable with the aperture in the second link arm.

10. The component mount of claim 9, further comprising an actuator mounted on the first link arm, at the first side of the component mount, the actuator coupled to and adapted to move the slideable coupling member into and out of engagement with the aperture in the second link arm.

11. The component mount of claim 1, wherein a second end of the second link arm, arranged opposite the first end, is spaced away from the second bushing and the third compressible member.

12. A component mounting system, comprising:
an actuator controlled by an electronic controller; and
a component mount, the component mount comprising:
a first link arm and a second link arm arranged adjacent to one another, the first link arm including apertures at both ends and the second link arm including an aperture at a first end;
a first compressible member bonded in a first aperture of the apertures of the first link arm, a second compressible member bonded in the aperture of the second link arm, and a third compressible member bonded in a second aperture of the apertures of the first link arm, the first aperture of the first link arm coaxial with the aperture of the second link arm;
a first bushing bonded in the first compressible member, the first bushing defining a first mounting bore for use in attaching the component mount to a component to be supported and a second bushing bonded in the third compressible member, the second bushing defining a second mounting bore for use in attaching the component mount to a support structure;
a first compressible load path formed by the first compressible member, the first link arm, and the third compressible member and a second compressible load path formed by the second compressible member and the second link arm; and
a coupling member, wherein the coupling member has a disengaged state in which the first load path and the second load path are not linked together by the coupling member and all of a force transmitted through the component mount, between the first bushing and the second bushing, is transmitted by the first load path and one or more engaged states in which the first load path and the second load path are directly connected together in parallel by the coupling member, and the force transmitted through the component mount, between the first bushing and the second bushing, is transmitted by the first and second load paths that are acting in parallel, wherein the actuator is operatively connected to the coupling member, and wherein the electronic controller is arranged to use the actuator to control a position of the coupling member based upon a level of force predicted to be transferred by the component mount.

13. The component mounting system as claimed in claim 12, wherein the electronic controller is arranged to use the actuator to position the coupling member in the engaged state when a level of force above a predefined level is predicted to be transferred by the component mount and position the coupling member in the disengaged state when the level of force predicted to be transferred is below the predefined level.

14. The component mounting system as claimed in claim 13, wherein the predefined level of force is a force that will produce an unacceptable displacement of the component supported by the component mount if the coupling member is in the disengaged state.

15. The component mounting system as claimed in claim 13, wherein the component mount is a driveline mount of a motor vehicle and the level of force above the predefined level is predicted to occur when an engagement state of a transmission forming part of the driveline mount is changed from a neutral state to the engaged state.

16. The component mounting system as claimed in claim 13, wherein the component mount is a driveline mount of a motor vehicle and the level of force above the predefined level is predicted to occur when a gear ratio of a transmission forming part of the driveline mount is changed from a first ratio to a second ratio.

17. A component mount, comprising:
a first bushing extending through the component mount, from a first side to a second side of the component mount and a second bushing extending through the component mount, from the first side to the second side, the first bushing arranged at a first end of the component mount and the second bushing arranged at an opposite, second end of the component mount;
a first link arm extending from the first end to the second end and arranged at the first side, the first link arm having a first aperture at the first end and a second aperture at the second end, and a second link arm extending from the first end to a position a distance away from the second end and arranged at the second side, the second link arm having a third aperture at the first end, the first link arm and the second link arm arranged adjacent to one another;
a first compressible member bonded to and around the first bushing and within the first aperture, a second compressible member bonded to and around the second bushing and within the second aperture, and a third compressible member bonded to and around the first bushing and within the third aperture;
a first compressible load path formed by the first compressible member, the first link arm, and the second compressible member and a second compressible load path formed by the third compressible member and the second link arm, the first and second load paths arranged in parallel with one another, between the first and second ends of the component mount; and
a coupling member supported within the first link arm, the coupling member having an engaged state in which an end of the coupling member is engaged with a receiving aperture in the second link arm, directly coupling the first link arm and the second link arm, and all of a transmitted force is transmitted through the component mount, between the first bushing and the second bushing, by the first load path and the second load path and a disengaged state in which the end of the coupling member is not engaged with the receiving aperture in the second link arm, the first link arm and the second link arm are not directly coupled to one another via the coupling member, and all of the transmitted force, between the first bushing and the second bushing, is transmitted by only the first load path.

18. The component mount of claim 17, further comprising an actuator mounted on the first link arm, at the first side of the component mount, the actuator coupled to and adapted to slide the coupling member into and out of engagement with the receiving aperture in the second link arm.

19. The component mount of claim 17, wherein the component mount is shaped as a dog bone, where the first and second ends are rounded, the first end having a larger diameter than the second end.

20. The component mount of claim 17, where the first aperture of the first link arm and the third aperture of the second link arm are coaxial with one another and wherein the first bushing is coaxial with each of the first aperture and the third aperture.

\* \* \* \* \*